United States Patent Office 3,315,006
Patented Apr. 18, 1967

3,315,006
DEHYDROGENATION PROCESS
Douglas S. Alexander and John Firko, Sarnia, Ontario, Canada, assignors to Polymer Corporation Limited, Sarnia, Ontario, Canada, a body corporate
No Drawing. Filed Dec. 3, 1962, Ser. No. 241,526
Claims priority, application Canada, Jan. 6, 1962, 839,491
7 Claims. (Cl. 260—680)

This invention relates to an improved process for the catalytic dehydrogenation of hydrocarbons. It relates particularly to improvements in the dehydrogenation of hydrocarbons in catalytic processes in which there is a tendency for carbonaceous deposits to form on the catalyst. In one of its more specific aspects, the invention relates to improvements in the dehydrogenation of hydrocarbons in the presence of calcium nickel phosphate-type dehydrogenation catalysts.

The catalytic dehydrogenation of hydrocarbons in the presence of dehydrogenation catalysts is well known. For example, it is well known that aliphatic hydrocarbons such as butane can be dehydrogenated by contacting them at a suitable temperature with a chromia-alumina catalyst. Similarly, it is known that mono-olefines can be dehydrogenated in the presence of certain catalysts in which the active ingredient is iron oxide, zinc oxide, magnesium oxide, or calcium nickel phosphate.

In most catalyzed dehydrogenation processes, side reactions lead to a carbonaceous deposit on the catalyst causing a gradual reduction in its activity. Therefore, to maintain the activity of the catalyst it is necessary to remove carbonaceous deposits periodically. It is general practice in such catalytic processes to use cyclic operations comprising alternately effecting dehydrogenation of the hydrocarbon and removal of the carbonaceous deposits from the catalyst. The part of the cycle during which the hydrocarbon is dehydrogenated is called the "process period," while the part in which the carbonaceous deposit is oxidized is called the "regeneration period." The process period is normally effected at temperatures between about 500° C. and 700° C. by passing the hydrocarbon through a catalyst bed, while the regeneration period is carried out at about the same temperature by passing air through the catalyst bed. It has been general practice in such commercial dehydrogenation operations up to the present to employ process periods of fifteen minutes or longer. During the regeneration period the temperature of the catalyst bed rises quite sharply. This temperature rise, if excessive, is harmful to the stability of operation and adversely affects the operating life of the catalyst. The magnitude of the temperature rise during the regeneration period is a function of the quantity of the carbonaceous deposits accumulated on the catalyst surface which is, in turn, a function of cycle length and temperature as well as other operating variables.

Because of the tendency of dehydrogenation reactions to produce by-products, dehydrogenation reactions are seldom carried to completion, the actual conversion depending upon economic considerations of the particular process. It is desirable, in general, to obtain as high a yield as possible of the desired reaction product. Percent selectivity is herein defined as the percentage of the hydrocarbon converted to the desired product. Conversion is the percentage of the hydrocarbon feed which is converted. Yield is defined as the product of conversion and percent selectivity. In present commercial operations, the conversion of hydrocarbon per pass is generally less than 50%. In order to obtain substantially pure product and not to waste the unconverted hydrocarbon, it is necessary to separate the desired compound from the reaction product stream and recycle the latter for further conversion. Extraction of the desired compound from the reactor product stream is normally carried out at a relatively low temperature and the unconverted hydrocarbon requires reheating before being recycled. Therefore, it is readily appreciated that it is desirable to effect as high a conversion as possible for each contacting operation in order to keep to a minimum the power and heat energy requirements as well as the cost of equipment used in processing the recycle hydrocarbons.

The object of the present invention therefore is to provide an improved process for the catalytic dehydrogenation of hydrocarbons wherein the percentage conversion is greatly increased.

A further object of the invention is to provide increased conversion of hydrocarbons while at the same time improving the stability of the dehydrogenation operation and increasing the life of the catalyst.

The inventors have now discovered that the yield of the desired hydrocarbons in a cyclic dehydrogenation operation can be greatly increased by the use of very short process periods.

The objects of the invention are achieved in the catalytic dehydrogenation of a hydrocarbon in a cyclic operation of alternately dehydrogenating the hydrocarbon in a process period and regenerating the catalyst in a regeneration period, by the improvements which comprises limiting the duration of the process period to between 30 seconds and 5 minutes.

In one of its more specific aspects, the objects of the invention are achieved by the process of dehydrogenating a monoolefin having at least four carbon atoms in the olefinic chain in admixture with steam and with between 5 and 40 percent uncombined oxygen based on the volume of said hydrocarbon and at a temperature of 550° C. to 700° C. in the presence of a dehydrogenation catalyst, the active ingredient of which is calcium nickel phosphate, in a cyclic operation which comprises alternately dehydrogenating the hydrocarbon in a process period and regenerating the catalyst in a regeneration period, the duration of the process period being between 30 seconds and 5 minutes.

In its broad aspects, the present invention can be used for the catalytic dehydrogenation of various hydrocarbons in the presence of a variety of dehydrogenation catalysts. For example, it can be used in the catalytic dehydrogenation of aliphatic hydrocarbons having at least 4 carbon atoms such as butane, normal and iso-pentane, hexane and the like as well as monoolefinic hydrocarbons containing at least four carbon atoms in the olefinic chain such as butylenes, normal and iso-pentene and hexenes, and alkylated aromatic compounds containing at least 2 carbon atoms in the alkyl group, such as ethylbenzene. Normal butane may be dehydrogenated to butylenes and butadiene, normal butylenes may be dehydrogenated to butadiene-1,3, isopentane may be dehydrogenated to isoprene and ethylbenzene may be dehydrogenated to styrene. Examples of the dehydrogenation catalysts which may be used include chromia-alumina catalysts which are now used commercially in the dehydrogenation of normal butane to produce butylenes and butadiene-1,3, iron oxide and zinc oxide-type catalysts which are used commercially in the production of styrene from ethylbenzene, as well as calcium-nickel phosphate-type catalysts which are used commercially for the production of butadiene-1,3, by the dehydrogenation of n-butylenes. The invention is of particular advantage in the dehydrogenation of hydrocarbons having 4 to 8 carbon atoms using dehydrogenation catalysts in which the active ingredient is calcium nickel phosphate.

The chromia-alumina catalyst mentioned above is used in the absence of water vapour whereas the other catalysts are used in the presence of relatively large quantities of steam, the quantity of which may vary widely although it is generally between about 5 and 50 volumes per volume of hydrocarbon vapour. The preferred steam to hydrocarbon ratio is between about 15:1 and 25:1 on a volume basis for calcium nickel phosphate-type catalysts and 8:1 and 15:1 on a volume basis for other catalysts with which steam is used as diluent such as the iron oxide and zinc oxide type.

The dehydrogenation reaction is usually carried out at about atmospheric pressure, for convenience, but higher or lower pressures may be used if desired. For best results, the contact time of the hydrocarbon with the catalyst is relatively short. It is usually desirable to use contact times between about 0.25 and 1.2 seconds, although times outside this range may be used without departing from the scope of the invention. The optimum contact time varies with the particular hydrocarbon being dehydrogenated, the reaction temperature and the age of the catalyst. The activity of a dehydrogenation catalyst gradually decreases with age.

The duration or length of the process period and the regeneration period are usually about the same and may be regulated at will, although the lower limit is usually determined by mechanical or equipment limitations associated with the problems of stopping the hydrocarbon flow and purging the catalyst bed at the end of the process period and before beginning the regeneration period; and stopping the oxygen flow and again purging the reactor at the end of the regeneration period and before the beginning of the next process period. In accordance with the present invention the length of the process period must be 5 minutes or less. It has been found by the inventors that the highest yield of the desired product is achieved with process periods of the shortest possible duration. It was also found that when using a catalyst which has a tendency for rapid carbon build-up and operating with a process period of less than 30 seconds, and a regeneration period of the same length, carbonaceous deposits gradually build up on the catalyst and destroy its activity. Under such conditions the carbon deposited on the actalyst is not completely burned off during the regeneration period. In order to achieve the advantage of the increased yield due to short process periods and also to allow for complete removal of the carbonaceous deposit, the duration of the process period according to the present invention is between about 30 seconds and 5 minutes with the preferred range being from 40 seconds to 2 minutes.

The present invention has been found to be particularly advantageous when using a dehydrogenation catalyst in which the active ingredient is calcium nickel phopshate. This catalyst is used in the presence of steam. The quantity of steam may vary widely and is generally between 10 and 50 volumes per volume of hydrocarbon vapour being dehydrogenated. The preferred steam:hydrocarbon ratio is between about 15:1 and 25:1 on a volume basis. In practice, the catalyst bed is usually heated to the desired reaction temperature before the admission of hydrocarbon, preferably by passing therethrough air and steam superheated to a suitably high temperature. However, it may also be brought to the desired temperature by the application of external heat to the reactor. The hydrocarbon and steam may be heated in separate furnaces and then admixed before contact with the catalyst, the hydrocarbon to about 450° C.–550° C., and the steam to about 700° C.–850° C. or higher so that a mixture of the two has the desired reaction temperature of about 550–700° C. The heat may also be supplied by forming the steam and hydrocarbon mixture at a lower temperature and passing the mixture through a preheater to bring it to the reaction temperature or by externally heating the reactor containing the catalyst.

A further feature of the invention comprises improving the process of dehydrogenating hydrocarbons using catalysts in which the active ingredient is calcium nickel phosphate. It has been found that a mixture of steam and oxygen can be passed continuously through the catalyst bed with intermittent addition of hydrocarbon to this mixture, thereby effecting a cyclic operation. This process has the advantage of not requiring purging of the reactor between the two periods of the operation. It is of particular advantage in the dehydrogenation of normal butylenes. In this process the oxygen may be introduced into the system in any satisfactory form so long as it is present in the reactor in uncombined form. Uncombined oxygen is hereby defined as oxygen which is not combined with another element but exists as O, $O_2$ or $O_3$ in the catalyst zone. It may be introduced into the reactor as substantially pure oxygen in atmospheric air, in admixture with an inert gas such as $CO_2$ or nitrogen, or it may be introduced in a compound such as hydrogen peroxide or oxides of nitrogen which liberate oxygen under the conditions prevailing in the reactor. Obviously, it cannot be introduced in combined form in compounds which, on decomposition, will form by-products that are injurious to the dehydrogenation process. For example, chlorine and sulphur compounds are known to be poisons of a calcium nickel phosphate-type catalyst. Those skilled in the art are readily able to select compounds which may be used as satisfactory oxygen sources.

The best results and most of the advantages of the invention are realized when the steam/oxygen mixture is flowing through the reactor continuously and hydrocarbon feed is injected into the reactor intermittently. The process may also be operated by having the steam flowing through the reactor continuously and injecting both the hydrocarbon and oxygen in an intermittent fashion. However, the increase in yield of the desired product which results from the operation when both the hydrocarbon and oxygen are injected intermittently is less than that obtained when a steam-oxygen mixture flows continuously and the hydrocarbon is injected intermittently.

The amount of oxygen which it is desirable to have in the reactor lies generally between about 5 and 50 parts by volume of oxygen per 100 volumes of hydrocarbon. The preferred range is between 10 and 40 parts by volume of the hydrocarbon. The optimum concentration of oxygen varies with operating conditions such as temperature, steam:hydrocarbon ratio and the particular catalyst being used. In general an excessive amount of oxygen will increase the conversion but may affect the selectivity adversely and lead to excessive contamination of product, while insufficient oxygen will not remove all the carbonaceous deposits from the catalyst surface during regeneration with the result that these deposits will build up and cause gradual deterioration of the activity of the catalyst. The optimum concentration of oxygen for any given set of conditions can be determined readily by those skilled in the art.

The following experiments will further illustrate the practice and advantages of the invention. Experiment A is included to illustrate prior art practice and is not an illustration of the present invention. The experiments were carried out using 500 grams of a commercial calcium nickel phosphate-chromium oxide catalyst described in United States Patent No. 2,442,320 issued May 25, 1948, and prepared in accordance with United States Patent No. 2,542,813 issued February 20, 1951. The catalyst was in the form of cylindrical pellets having dimensions of 3/16" x 3/16". A typical analysis of such catalyst is: nickel 5.0%; calcium 30.3%; phosphate radical 53.2%; chromic oxide 2.9%; graphite 2.4%. The catalyst was contained in a quartz reaction vessel having an inlet at the top and an outlet at the bottom. Thermocouples located in the top, the middle, and the bottom of the catalyst bed enabled temperatures to be measured as desired.

EXPERIMENT A

Butene-1 flowing at the rate of 645 ml./min., measured at normal temperature and pressure, was admixed with steam flowing at the rate of 9.3 gm./min. This mixed feed flowed through a tubular electric heater which brought its temperature to 602° C. and through the bed continuously for 15 minutes. The product was collected in a flask. The catalyst was then regenerated by stopping the flow of hydrocarbon and introducing oxygen in its place for a period of 15 minutes after which butene-1 was again dehydrogenated for a process period of 15 minutes and the product again collected. The temperature in the middle of the catalyst bed dropped during the process periods from 602° C. to 582° C. The product from each process period was analyzed by gas chromatography to determine the amount of butadiene produced and the results are shown in Table I.

TABLE I

| Period No. | Mixed Feed Temp. (° C.) | Conversion (percent) | Selectivity (percent) | Yield (percent) |
|---|---|---|---|---|
| 1 | 602 | 39.6 | 91.4 | 36.2 |
| 2 | 602 | 39.3 | 92.1 | 36.2 |

Example 1

Butene-1 was dehydrogenated using the same catalyst as used in Experiment A. A steam-oxygen mixture containing 10 volumes of oxygen per 100 volumes of hydrocarbon was passed continuously for five and one-half hours through the catalyst bed. The flow rate was 9.3 grams of steam per minute. Butene-1 was added to the steam-oxygen mixture at the rate of 645 mls./minute in a cyclic operation in which the hydrocarbon flow was stopped for a one minute interval after each period of flow of one minute. In this way, dehydrogenation was carried out in a cyclic operation having alternating process periods and regeneration periods each of one minute duration. The mixed feed temperature and the temperature of the steam-oxygen mixture entering the reactor in the regeneration period was 602° C. On the introduction of the hydrocarbon feed in the first process period, the temperature in the middle of the catalyst bed dropped rapidly two centigrade degrees and remained at that level throughout the balance of the experiment. The product was accumulated and analyzed as in Experiment A after one hour, three hours and five hours operation. The results are shown in Table II.

TABLE II

| Time of Sample | Conversion (percent) | Selectivity (percent) | Yield (percent) |
|---|---|---|---|
| 1 hour | 47.9 | 90.4 | 43.3 |
| 3 hours | 47.1 | 90.4 | 42.6 |
| 5 hours | 47.5 | 90.2 | 42.8 |

By comparing the figures of Table II with those of Table I, it is apparent that there is a very substantial increase in the conversion of the hydrocarbon and in the yield of butadiene.

Example 2

Butene-1 was dehydrogenated as in Example 1 except that the mixed feed temperature and the temperature of the steam-oxygen mixture used in regeneration was varied. The first process period in each temperature range was of 15 minutes duration and subsequent periods were of one minute duration. The 15 minute periods are not in accordance with the present invention but the results of these tests are included to illustrate the value of the invention over the prior art practice. The product obtained during the 15 minute period was collected and analyzed. The product was accumulated during the operation with one minute process periods and analyzed after 3 hours and 5 hours. The results are shown in Table III.

TABLE III

| Mixed Feed Temp. (° C.) | Process Period (Minutes) | Time of Analysis | Conversion (percent) | Selectivity (percent) | Yield (percent) |
|---|---|---|---|---|---|
| 620 | 15 | After 1st period | 45.6 | 90.8 | 41.5 |
| 620 | 1 | After 3 hours | 54.3 | 88.5 | 48.0 |
| 620 | 1 | After 5 hours | 53.3 | 89.2 | 47.5 |
| 630 | 15 | After 1st period | 47.0 | 89.7 | 42.2 |
| 630 | 1 | After 3 hours | 56.5 | 88.7 | 50.1 |
| 630 | 1 | After 5 hours | 56.2 | 88.6 | 49.8 |
| 650 | 15 | After 1st period | 55.2 | 87.8 | 48.5 |
| 650 | 1 | After 3 hours | 62.5 | 85.5 | 53.4 |
| 650 | 1 | After 5 hours | 62.4 | 85.9 | 53.6 |
| 670 | 15 | After 1st period | 61.6 | 82.7 | 50.9 |
| 670 | 1 | After 3 hours | 69.7 | 82.0 | 57.1 |
| 670 | 1 | After 5 hours | 68.6 | 83.4 | 57.2 |

Example 3

Butene-1 was dehydrogenated as in Example 2 except that oxygen was not passed through the reactor during the process period. There was thus an alternating flow of a hydrocarbon-steam mixture and a steam-oxygen mixture through the catalyst. The duration of the process period was varied, with the associated regeneration periods being of the same duration. The product of each process period was recovered and analyzed. The results are shown in Table IV, the selectivity and yield being calculated for the butadiene produced.

TABLE IV

| Mixed Feed Temp. (° C.) | Process Period (Minutes) | Conversion (Percent) | Selectivity (Percent) | Yield (Percent) |
|---|---|---|---|---|
| 620 | 15 | 43.4 | 91.1 | 39.5 |
| 620 | 5 | 45.8 | 91.0 | 41.7 |
| 620 | 1 | 49.3 | 90.7 | 44.3 |
| 650 | 15 | 53.7 | 87.7 | 47.1 |
| 650 | 10 | 54.3 | 88.0 | 47.8 |
| 650 | 5 | 55.4 | 88.0 | 48.8 |
| 650 | 1 | 58.6 | 87.2 | 51.1 |
| 670 | 15 | 60.9 | 84.7 | 51.6 |
| 670 | 1 | 63.9 | 86.0 | 55.0 |

These data show that the yield of butadiene is increased appreciably when a process period of five minutes or less is used instead of the longer process periods of prior art practice. A simple plot of the data show that conversion and yield increase very rapidly as the duration of the process period is decreased below 5 minutes and especially below about 2 minutes.

Example 4

Normal butane was dehydrogenated using the same procedure as in Example 2 except that the mixed feed temperature was 652° C. The butane, flowing at the rate of 235 ml./minute, measured at normal temperature and pressure, was admixed with steam flowing at the rate of 3.15 gm./min. which had mixed therewith oxygen flowing at the rate of 23.5 ml./min. The product obtained during the initial 15 minute process period was analyzed as were snap samples taken at two hour intervals during operations using the subsequent one minute process periods. The results are shown in Table V.

TABLE V

| Process Period (Minutes) | Time of Sample | Conversion (Percent) | Selectivity (Percent) | Yield (Percent) |
|---|---|---|---|---|
| 15 | After 1st period | 21.8 | 69.6 | 15.2 |
| 1 | After 2 hours | 24.7 | 65.6 | 16.2 |
| 1 | After 4 hours | 24.7 | 65.3 | 16.1 |
| 1 | After 6 hours | 23.9 | 65.6 | 15.7 |

The selectivity was calculated with respect to the total unsaturated $C_4$ compounds produced. From these data, it is seen that, in the dehydrogenation of n-butane according to the present invention, the conversion is increased over the prior art operations.

*Example 5*

2-methyl butene-2 was dehydrogenated according to the procedure of the previous examples over a commercial calcium nickel phosphate dehydrogenation catalyst. Three runs were carried out using process and regeneration periods of 15 minutes duration and three runs using periods of one minute duration. In the runs using one minute periods, there was also present in the feed 10 volumes of oxygen per 100 volumes of hydrocarbon. The 2-methyl butene-2 was fed at the rate of 500 mls./min. and the steam flow as 10.0 grams/minute. The steam to hydrocarbon ratio on a volume basis was 25:1 and the contact time was 0.7 second. Each run was of two hours duration and the product was accumulated and analyzed. The results are shown in Table VI, the selectivity and yield being calculated for the isoprene produced.

TABLE VI

| Run No. | Mixed Feed Temp. (° C.) | Process Period (Minutes) | Conversion (Percent) | Selectivity (Percent) | Yield (Percent) |
|---|---|---|---|---|---|
| 1 | 607 | 15 | 29.4 | 95.2 | 28.0 |
| 2 | 610 | 15 | 29.8 | 94.8 | 28.2 |
| 3 | 611 | 15 | 30.8 | 94.8 | 29.2 |
| 4 | 610 | 1 | 46.0 | 93.3 | 42.9 |
| 5 | 608 | 1 | 46.2 | 93.9 | 43.3 |
| 6 | 609 | 1 | 41.8 | 94.0 | 39.3 |

While the invention has been illustrated using a calcium nickel phosphate dehydrogenation catalyst and is of particular advantage with such a catalyst using oxygen admixed with the hydrocarbon, it applies generally to cyclic catalytic dehydrogenation operations in which there is a tendency for carbonaceous deposits to form on the catalyst.

The embodiments of the invention in which an exclusive property or privilege is claimed are:

1. In the process of dehydrogenating a hydrocarbon feed comprising at least one hydrocarbon selected from paraffinic hydrocarbons having at least four carbon atoms, aliphatic monoolefinic hydrocarbons containing at least four carbon atoms in their olefinic chains and alkylated aromatic hydrocarbons containing at least two carbon atoms in their alkyl groups, in the presence of steam and with a fixed bed of a pelleted calcium nickel phosphate dehydrogenation catalyst, in a cyclic operation, comprising alternately dehydrogenating the hydrocarbon feed at a dehydrogenation temperature in a process period and regenerating the catalyst in a regeneration period, the improvement which comprises limiting the duration of the process period to between 30 seconds and 5 minutes.

2. The process according to claim 1, in which the hydrocarbon feed comprises butene-1 or isopentene.

3. The process according to claim 2, in which the duration of the process period is between 40 seconds and 2 minutes.

4. In the process of dehydrogenating a hydrocarbon feed comprising at least one hydrocarbon selected from paraffinic hydrocarbons having at least four carbon atoms, aliphatic monoolefinic hydrocarbons containing at least four carbon atoms in their olefinic chains and alkylated aromatic hydrocarbons containing at least two carbon atoms in their alkyl groups, in the presence of steam and 5 to 50 volumes of uncombined oxygen for every 100 volumes of said hydrocarbon feed and with a fixed bed of a pelleted calcium nickel phosphate dehydrogenation catalyst in a cyclic operation, comprising alternately dehydrogenating the hydrocarbon feed at a dehydrogenation temperature in a process period and regenerating the catalyst in a regeneration period, the improvement which comprises limiting the duration of the process period to between 30 seconds and 5 minutes.

5. The process of claim 4 in which the dehydrogenation is effected in the presence of 10 to 40 volumes of uncombined oxygen for every 100 volumes of hydrocarbon feed.

6. The process of claim 5 in which the hydrocarbon feed comprises butene-1 or isopentene.

7. The process of claim 6 in which an admixture of said steam and said oxygen is continuously passed through said fixed bed of pelleted calcium nickel phosphate dehydrogenation catalyst and in which said hydrocarbon feed is intermittently added to said admixture thereby effecting said cyclic operation.

References Cited by the Examiner

UNITED STATES PATENTS

| | | | |
|---|---|---|---|
| 2,474,014 | 6/1949 | Seebold | 260—680 |
| 2,945,900 | 7/1960 | Alexander et al. | 260—680 |
| 2,978,522 | 4/1961 | Cahn | 260—680 |
| 3,207,806 | 9/1965 | Bajars | 260—680 |

OTHER REFERENCES

Britton et al., "Industrial and Engineering Chemistry," vol. 43, (1951), pages 2871–2874.

PAUL M. COUGHLAN, Jr., *Primary Examiner.*

ALPHONSO D. SULLIVAN, *Examiner.*